(12) United States Patent (10) Patent No.: US 8,073,868 B2
Lavi (45) Date of Patent: Dec. 6, 2011

(54) SYSTEM FOR FACILITATING SEARCH OVER A NETWORK

(75) Inventor: Amir Lavi, Ramat Gan (IL)

(73) Assignee: SortFix, Ltd., Kiryat Arba (IL)

( * ) Notice: Subject to any disclaimer, the term of this patent is extended or adjusted under 35 U.S.C. 154(b) by 352 days.

(21) Appl. No.: 11/611,550

(22) Filed: Dec. 15, 2006

(65) Prior Publication Data

US 2007/0266019 A1 Nov. 15, 2007

Related U.S. Application Data

(63) Continuation of application No. PCT/IL2005/000671, filed on Jun. 23, 2005.

(60) Provisional application No. 60/582,080, filed on Jun. 24, 2004.

(51) Int. Cl.
*G06F 7/00* (2006.01)
*G06F 17/30* (2006.01)

(52) U.S. Cl. ........................................ 707/779; 707/706

(58) Field of Classification Search .............. 707/5, 779, 707/999.003, 999.005, 999.101
See application file for complete search history.

(56) References Cited

U.S. PATENT DOCUMENTS

| | | | |
|---|---|---|---|
| 6,169,986 B1 * | 1/2001 | Bowman et al. ....... | 707/999.005 |
| 6,374,275 B2 | 4/2002 | Wasilewski | |
| 6,732,090 B2 * | 5/2004 | Shanahan et al. ................. | 707/3 |
| 6,738,759 B1 * | 5/2004 | Wheeler et al. ................... | 707/3 |
| 6,745,180 B2 * | 6/2004 | Yamanoue ......................... | 707/3 |
| 6,748,375 B1 * | 6/2004 | Wong et al. ....................... | 707/3 |
| 6,820,075 B2 * | 11/2004 | Shanahan et al. ................. | 707/3 |
| 7,110,998 B1 * | 9/2006 | Bhandari et al. ................. | 707/4 |
| 7,158,969 B2 * | 1/2007 | Dettinger et al. ................. | 707/4 |
| 2003/0220913 A1 * | 11/2003 | Doganata et al. ................. | 707/3 |
| 2004/0205448 A1 * | 10/2004 | Grefenstette et al. ......... | 715/500 |
| 2005/0210000 A1 * | 9/2005 | Michard .......................... | 707/3 |

OTHER PUBLICATIONS

International Search Report Dated Dec. 12, 2005 From the US Patent and Trademark Office Re.: Application No. PCT/IL05/00671.
Written Opinion Dated Dec. 12, 2005 From the International Searching Authority Re.: Application No. PCT/IL05/00671.
Office Action Dated Oct. 25, 2010 From the Israel Patent Office Re. Application No. 179925 and Its Translation Into English.

* cited by examiner

*Primary Examiner* — Sathyanarayan Pannala
(74) *Attorney, Agent, or Firm* — Myers Wolin, LLC

(57) ABSTRACT

This invention provides the data network user with an interactive search engine environment that helps him focus on the object of his search. Through a powerful graphical user interface (GUI), the user is provided with terms closely related to what he is looking for, even when he has no prior knowledge of the subject or its terminology. The user is also provided with suggested terms that should be excluded from the search because of the high probability of interfering with the search. The contribution of each term to the search progress is explained to the user. The invention then enables the user to build complex queries combining the related terms in a visual and simple way that facilitates the search process and saves time. This invention allows the user to create a detailed, precise, and longer search query then is customarily executed today.

30 Claims, 20 Drawing Sheets

| Query String | Web Site Description | Equal (match) | Different | Score | Remarks |
|---|---|---|---|---|---|
| Op1(cat) | Op1(cat) | 1 | 0 | 1 | |
| Op1(cat) | Op2(cat) | 0 | 1 | -1 | The Score can be determined by the difference between the operators |
| Op1(cat) | Op1(dog) | 0 | 1 | -1 | The Score can be determined by the difference between the words contexts |
| Op1(cat) Op2(dog) | Op1(cat) | 1 | 0 | 1 | |
| Op1(cat) Op2(dog) | Op1(cat) Op2(dog) | 2 | 0 | 2 | |
| Op1(cat) | Op1(cat) Op2(dog) | 1 | 1 | 1-1 = 0 | |

Figure 20

SYSTEM FOR FACILITATING SEARCH OVER A NETWORK

RELATED APPLICATIONS

The present application is a National Phase filing of PCT Patent Application No. PCT/IL2005/000671 having International Filing Date of Jun. 23, 2005, which claims priority from U.S. Provisional Patent Application No. 60/582,080, filed on Jun. 24, 2004. The contents of the above Applications are herein incorporated by reference.

FIELD OF THE INVENTION

The present invention relates generally to search engines and more particularly to an environment that facilitates the search process by suggesting relevant search keywords to the user and facilitating the creation of a detailed and precise search query.

BACKGROUND

Today, search engines are a critical and invaluable means of providing access to the vast stores of information available on the internet, including news, online purchasing, information, and research. As such, search engines represent a significant and integral part of all internet tools.

The search engine market enjoys high revenues, about $6 billion yearly, according to 2003 annual reports. The substantial profits are based mainly on providing advertising that matches the search subjects.

Although search engines are widely used, the majority of users have difficulty in retrieving the specific information for which they are looking because of the complexities involved with precisely defining the parameters for each search query, according to the available information in the internet or database.

A major problem faced by users when formulating a search is the user's lack of familiarity with the search subject. Because the user is not familiar with the common terminology of the subject, he is unable to adequately define the necessary search parameters. Another problem facing the average user is that he does not have the tools or resources to create a detailed search query, and once results are returned, does not modify or refine the query in order to narrow the search results.

While existing search engines do provide fast results and wide coverage, only a limited number of the returned results, often numbering in the thousands and even millions, are relevant to the needs of the user. The task of scanning and filtering through all of the results in order to find useful information falls upon the user and feels much like trying to find the proverbial "needle in the haystack".

The resulting bottleneck in the search process prevents access to the sought-after information. In fact, studies show that the average number of results scanned by the user is less then 20. A controlled reduction of the irrelevant search results will facilitate the user's ability to scan for relevant results. Presently, however, there is no appropriate solution to this bottleneck in the search process.

There is a clear need for an effective tool that enables the user to specifically and quickly define the search terms required, according to the methods and terms used by the information providers, in order to reduce the amount of results in a controlled manner. The results of employing such a search system and method would be returning a greater proportion of responses that are relevant to the user, reducing the task of filtering through responses, and enabling quick and easy access to the sought-after information found on the Internet or other database.

SUMMARY OF THE INVENTION

Terminology

Related terms—words and expressions that are chosen intelligently by the present invention with the highest probability to match the users' needs and/or that are the most efficient for focusing the search query and for promoting the access to the desired information.

Related terms rank—The calculated importance and efficiency of the related terms, wherein the ranking function for the calculation is predefined or/and controlled by the user. The related terms rank is available to the user. The use of a higher ranked term in the search query promotes the search more efficiently then the use of lower ranked term.

Related terms icons—icons, either textual or graphical, of the related terms suggested by the present invention on the graphical user interface (GUI). The user is able to create a visual representation, which defines the search query and which also interprets the search query visually.

Requested term icons—icons, either textual or graphical on the graphical user interface (GUI). The user can receive a requested term icon for any word or term.

Data entities—data elements stored on the networked databases or knowledge database. In particular, these are words, expressions, graphical images, and any other files that hold information.

Presented herein is a system and method that saves time in the search process and enables efficient access to the information stored on the Internet or other database. This invention relates to improvements in or relating to searching of the Internet or other data networks. The invention provides the user with an interactive environment to define the search subject in accordance with the way the information is described in the data network and helps the user focus on the object of the search by providing a list of terms related to the search, plus their rank. The user is then encouraged to operate on these offered terms and his own search keywords through a user-friendly graphical user interface (GUI) and thus filter his search. This system and method enable the creation of effective search expressions, even in cases where the user does not have previous knowledge about the search topic or the optimal search method in related databases and/or their taxonomies.

In one embodiment of the present invention, the system has a query generator, a related terms generator, and at least one database. The related terms generator generates and holds at least one data structure representative of an inter-relationship between data entities in the different databases.

In one embodiment of this invention, the related terms generator builds the above-mentioned data structures prior to the search, based on the different databases.

In one embodiment, a method for facilitating a search over a data network is provided that includes the steps of receiving a search expression, providing related terms associated with the search expression, and producing a relevant related terms list, which enables the user to select additional search words from the related terms list. The user is then further able to define the relationships between related terms and other search words and generate a new query based upon the edited search expressions.

BRIEF DESCRIPTION OF DRAWINGS

Further features of the present invention, as well as the structure and operation of various embodiment of the present invention, are described in detail below with reference to the accompanying drawings:

FIG. 20 is a table showing how the related terms generator database operates according to one embodiment of the present invention.

Figure 1:
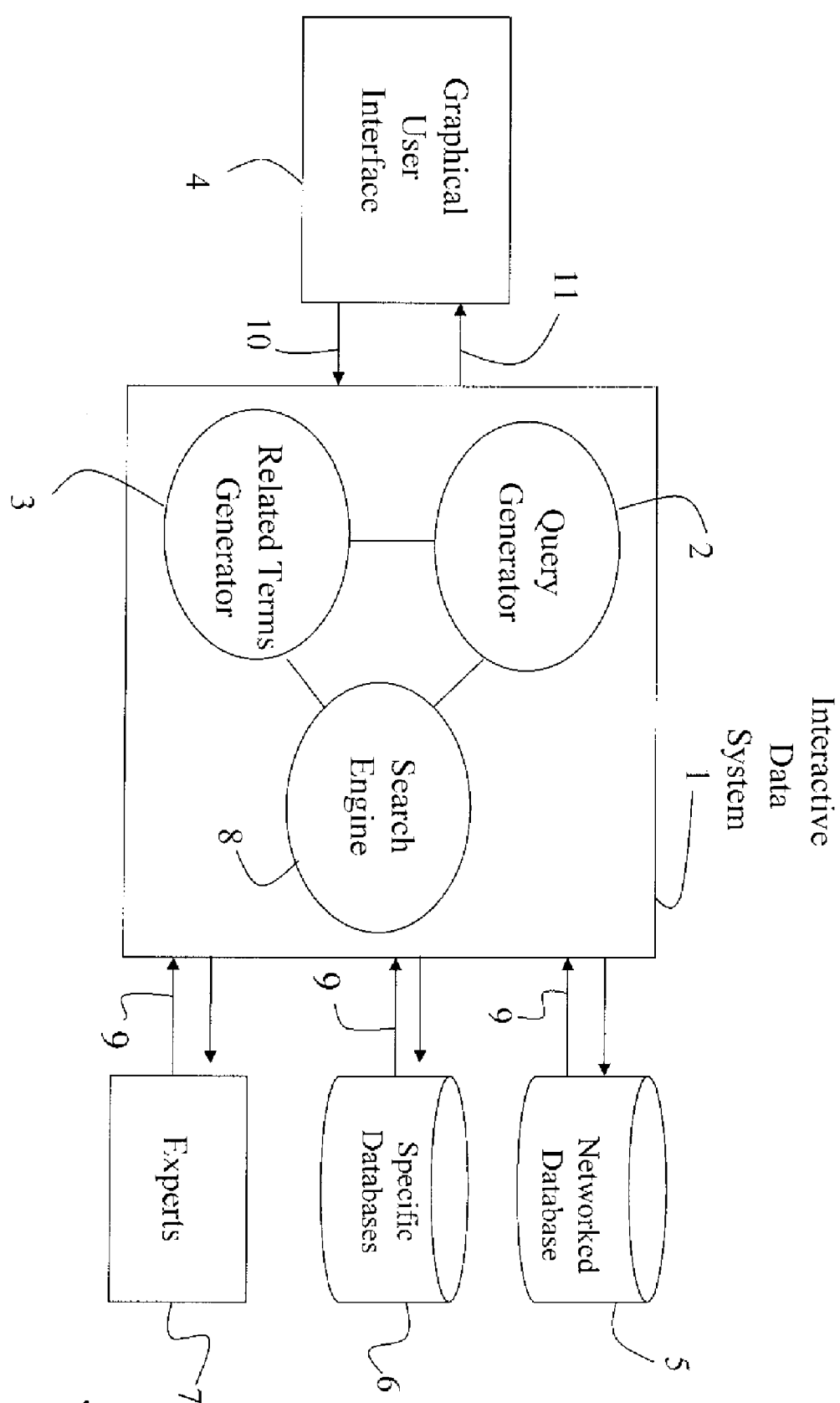
FIG. 1 is a block diagram of the interactive search facilitating system according to one embodiment of the present invention.

DETAILED DESCRIPTION OF THE PREFERRED EMBODIMENTS ACCORDING TO THE PRESENT INVENTION

The present invention provides a system and a method for interactive searching over networked databases. An interactive data management technology associated with a search engine is provided that suggests terms and keywords that are either closely related to the object of the search or highly unrelated to the object of the original search but included in the scope of the current search definition. A powerful graphical user interface allows the user to get highly involved in the search process. The GUI also facilitates and simplifies the use of operators, which today are not exploited by most users.

In one embodiment of this invention, the user is not required to fill in any search expression at all. The related terms generator suggests related terms for the user to choose, presented in a top-down hierarchy. In particular, the user is presented with general terms, which he uses to narrow the search by selecting additional related terms that are presented to him according to prior selections.

In one embodiment of the invention, the user is able to use words and expressions from the search results presented to him and embed them, together with his chosen related terms, in the next query. In particular, the user can receive a requested term icon and embed it in the visual query.

In one embodiment of this invention, the user is presented with related terms icons. The user is able to retrieve collected information about specific related terms, as well as the related terms ranks, by clicking on the related terms icon, a word, or any expression. In particular, the collected information that is presented to the user by clicking on the related terms icon is data amassed by the related terms generator and may include synonyms, context, and statistics corresponding to the specific related term.

In one embodiment of this invention, the related terms generator provides each related term that it generates with a corresponding related terms rank. In particular, each rank is calculated by the related terms generator so that the rank reflects the value of the specific related term within the current search process.

In one embodiment of the present invention, the present invention is compatible with operating on portable PDAs such as hand-held computers, cell phones, etc. In particular, this invention is designed to operate effectively on systems with limited resources (such as small screens) and limited input capabilities (such as limited typing capabilities).

In one embodiment of the invention, the user is provided with a powerful graphical user interface (GUI) that allows him to build a complicated query in a visual, and hence, simple fashion. In particular, the user is provided with related terms icons, search results, a visual query field, collected information field, results field and several operator frames. The user is able to drag and drop related terms icons and search results into the visual query field. The user is then able to drag and situate the operator frames over the related terms icons and search results icons in the visual query field according to the relationship and combination desired. In particular, the user is able to build any Boolean, logical, or taxonomical expression as a visual query.

Referring now to FIG. 1, a block diagram of the interactive data system 1 is depicted according to one embodiment of the present invention. Interactive data system 1 includes the following modules: a query generator 2, a related terms generator 3, and a search engine 5. Each module of the system operates in association with other modules as will be further described below. Query generator 2 is responsible for controlling interactive data system 1, building and interpreting search queries, and interrogating related terms generator 3. Related terms generator 3 is responsible for building and maintaining the data structures that are representative of the relationships between data entities in networked database 5. According to the preferred embodiment, these relationships reflect statistical correlations between the data entities in networked database 5.

Interactive data system 1 is connected to networked database 5, graphical user interface (GUI) 4, specific databases 6, and experts 7. Interactive data system 1 sends data requests to networked database 5, specific databases 6, and experts 7. Specific databases 6 can include a specific subject database of a professional dictionary. Experts 7 can include human subject knowledge experts that may answer questions on a specific subject upon request. Networked database 5, specific databases 6, and experts 7 return data elements 9 to interactive data system 1. Graphical user interface (GUI) 4 sends textual query inputs 10 or graphical query inputs 10 or both, as entered by user, to interactive data system 1.

Query inputs 10 are words that describe the information that is the goal of the search. Related terms 11 are outputs from interactive data system 1 to graphical user interface 4. Related terms 11 can include terms associated with the words of the search expression in accordance with the data entities stored on networked database 5, specific databases 6, and experts 7.

Figure 2:
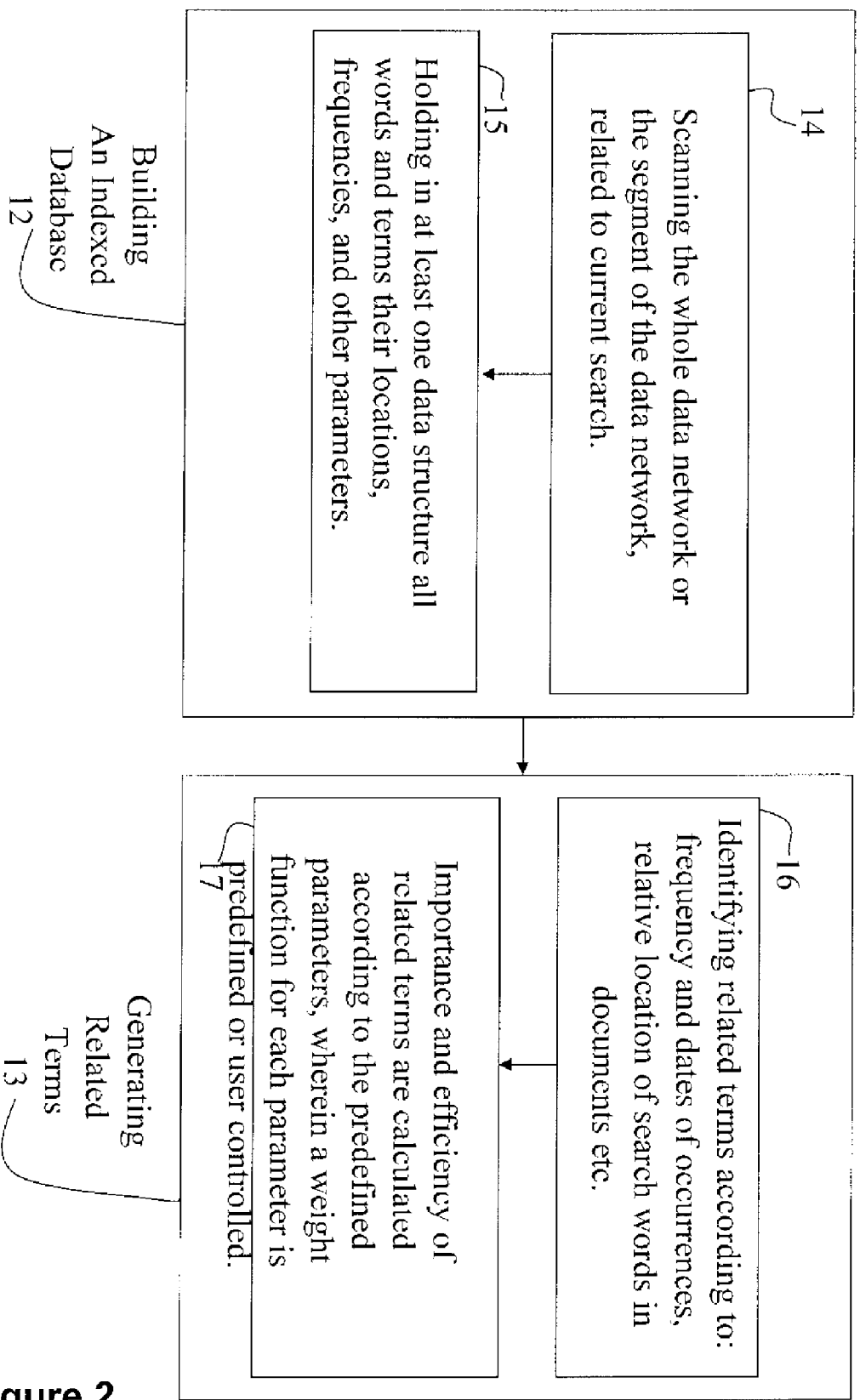
FIG. 2 is a flowchart showing the operation of the related terms generator.

FIG. 2 is a flowchart showing, in further detail how related terms generator 3 operates. According to one embodiment of this invention, prior to a search, a step of building an indexed database 12 is performed. This step includes the following sub-steps:

scanning the whole data network 14, and holding within at least one data structure all of the words, as well as their locations, frequencies, and other parameters 15.

According to all embodiments of this invention, a further step of generating related terms 13 is performed. This step includes two sub-steps:

identifying related terms according to frequencies and dates of occurrences, relative location of search words in documents, etc. 16 and calculating the importance and efficiency of related terms according to the predefined parameters 17. A ranking function for each parameter is predefined or user controlled.

Figure 3:
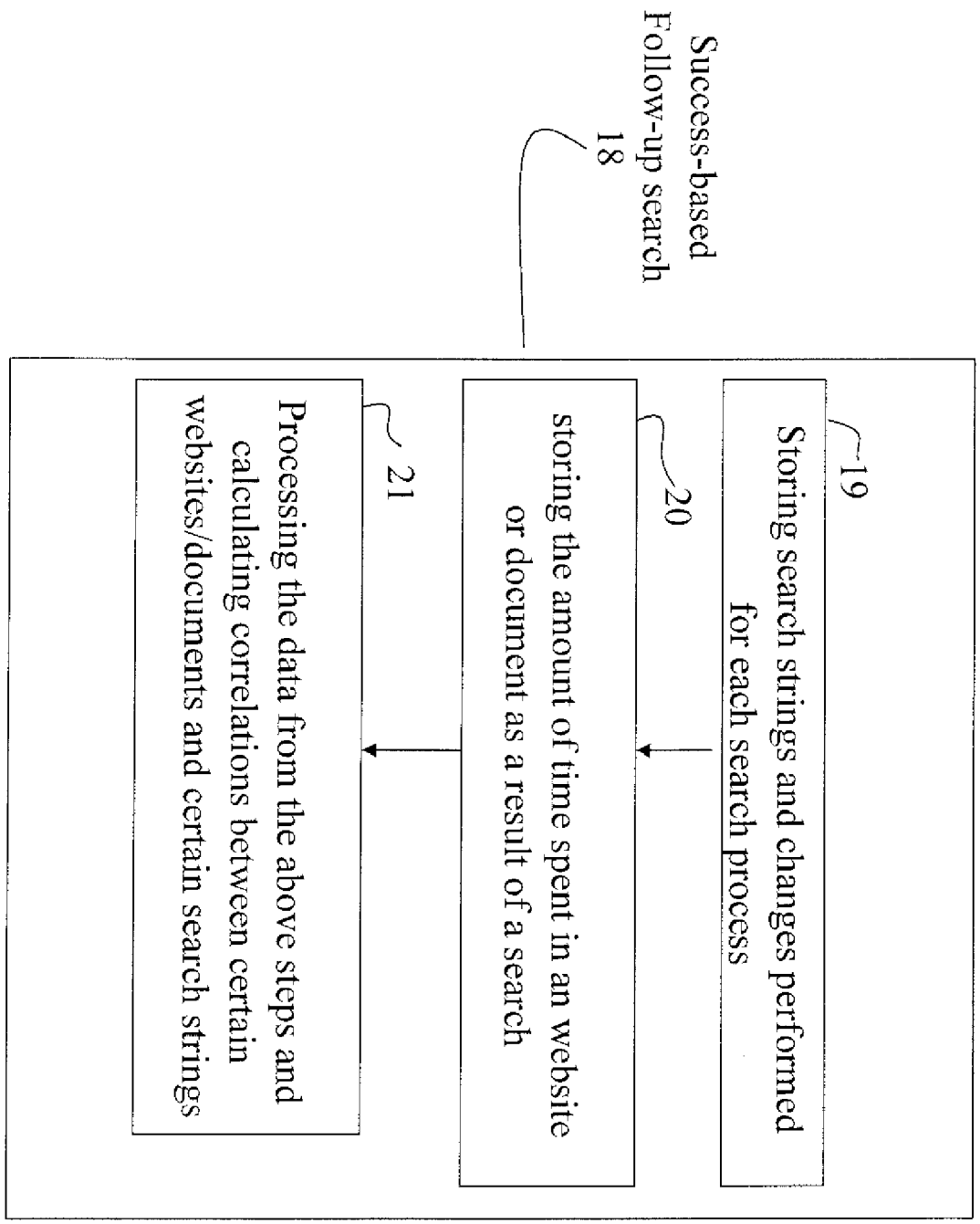
FIG. 3 is a flowchart showing the success-based follow-up search routine.

FIG. 3 shows a further embodiment of this invention related to a routine performed by the related terms generator 3. The routine, a success-based follow-Lip search 18, includes the following steps:

storing search strings and changes performed for each search process 19, storing the amount of time spent in any website or document as a result of the search 20, and finally, processing the data from the above steps and calculating correlations between certain websites/documents and certain search strings 21.

The routine also enables the related terms generator 3 to suggest related terms even before a new search is performed, based on data gathered from previous searches or current reviewed data. Additionally, the routine ensures that the data structure is maintained and updated by both indexing all of the pages that were visited while performing the search and by crawling through the Internet.

Figure 4:
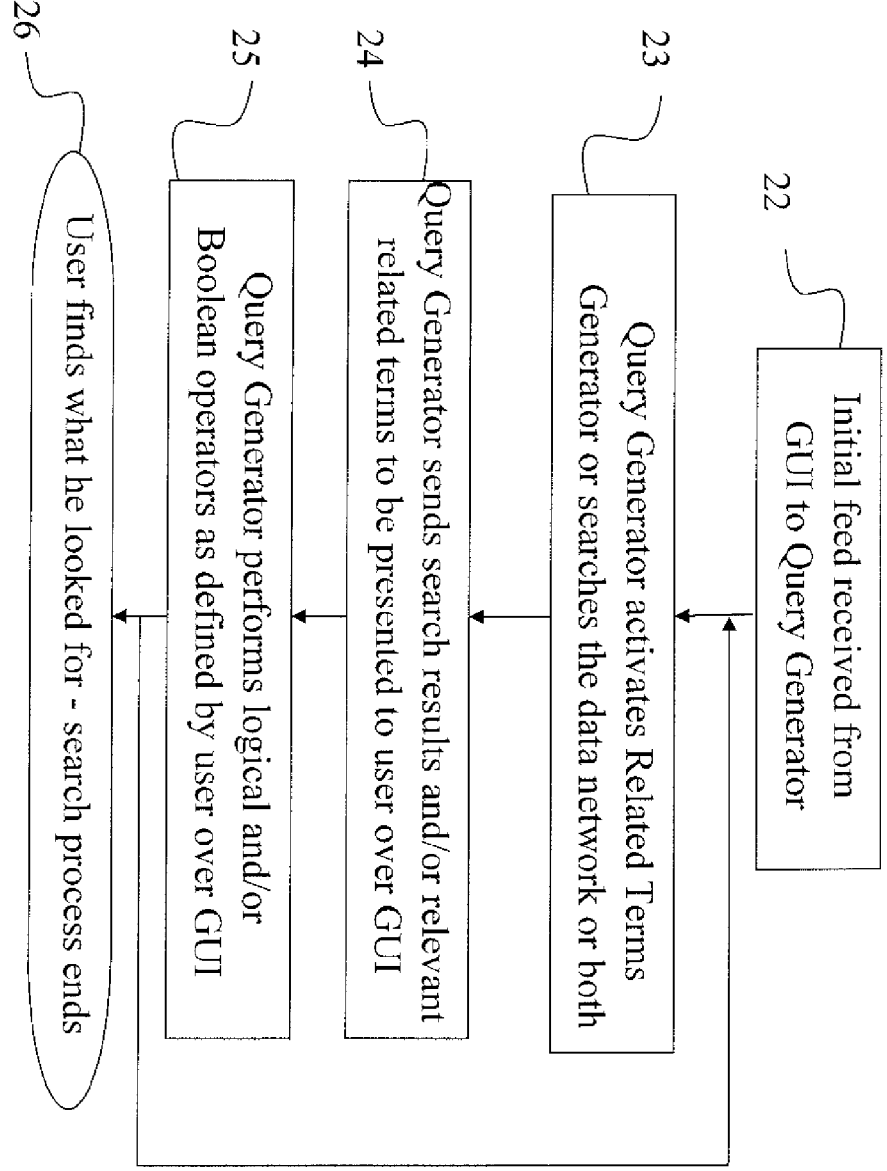
FIG. 4 is a flowchart showing the operation of the query generator throughout the search process.

FIG. 4 describes the steps taken by the query generator 2 during the interactive search process:

query generator 2 receives an initial feed from graphical user interface (GUI) 4, 22;

query generator 2 activates related terms generator 3 or searches the data network or both, 23;

query generator 2 sends the search results or the relevant related terms to be presented to the user or both over the graphical user interface (GUI) 4, 24 query generator performs logical and/or Boolean operators as defined by user over GUI 4, 25;

the user finds what he was looking for and search process ends, 26.

At this stage, the user is encouraged to further refine the search expression according to the related terms list presented to him and to more clearly define the relationship between the newly suggested search words.

Figure 5:
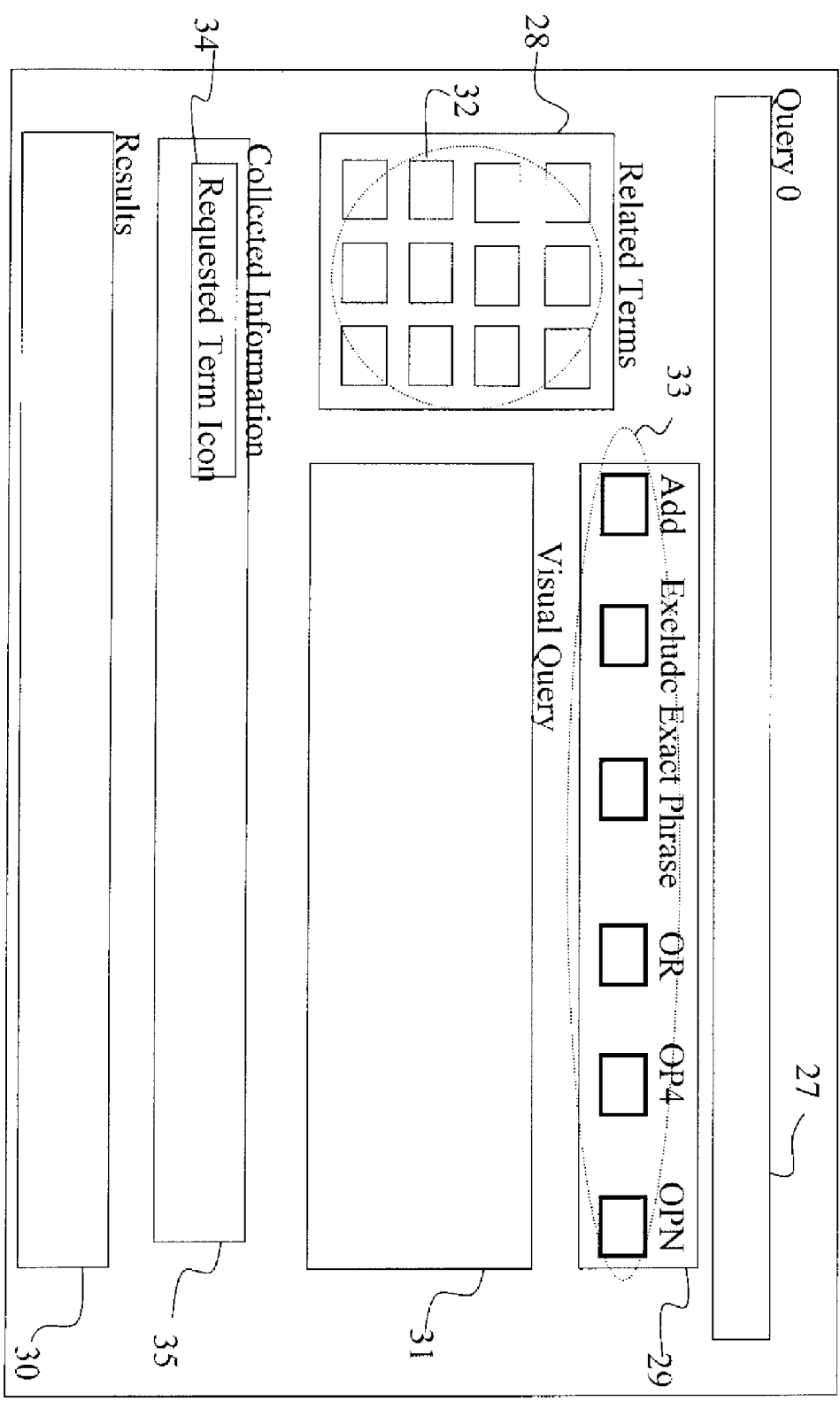
FIGS. 5-19 describe an example for an implementation of a graphical user interface according to the preferred embodiment of the invention.

FIGS. 5 to 19 describe examples for implementation the graphical user interface (GUI) 4, according to the preferred embodiment of the present invention. Referring to FIG. 5, the graphical user interface (GUI) 4 includes a query field 27, a related terms field 28, operator fields 29, a search results field 30, and a visual query field 35. The user can initiate a search by filling in query field 31 with a search expression. During the search process, relevant related terms icons 32 appear in related terms field 28. The user is able to drag the desired related terms icons 32 into visual query field 31. Operator fields 29 provide the user with a plurality of options. Such options include defining relationships between the search expression and related terms including proximity and frequency of appearance, Boolean operators, operators identifying related terms that are to be included in the search, and identifying related terms that are to be excluded from the search. In one embodiment of the invention, the user is able to drag any of the operator frames 33 in any of the operator fields 29 to the visual query field 31. The user is able to locate the operator frames 33 in the visual query field 31 according to the operation he wishes to perform. The results are then presented in search results field 30. The user may also drag a specific requested term icon 34 to the collected information field 35 and retrieve additional information about the specific related term. By using this exemplary GUI the user is easily able to graphically revise his search by implementing logical and Boolean combinations over both the original search expression and the newly suggested related terms. The graphical user interface (GUI) 4 allows the user to return repeatedly to the process of revising and refining his search.

The exemplary search sequence of FIGS. 6 to 10 will now be described.

Figure 6:
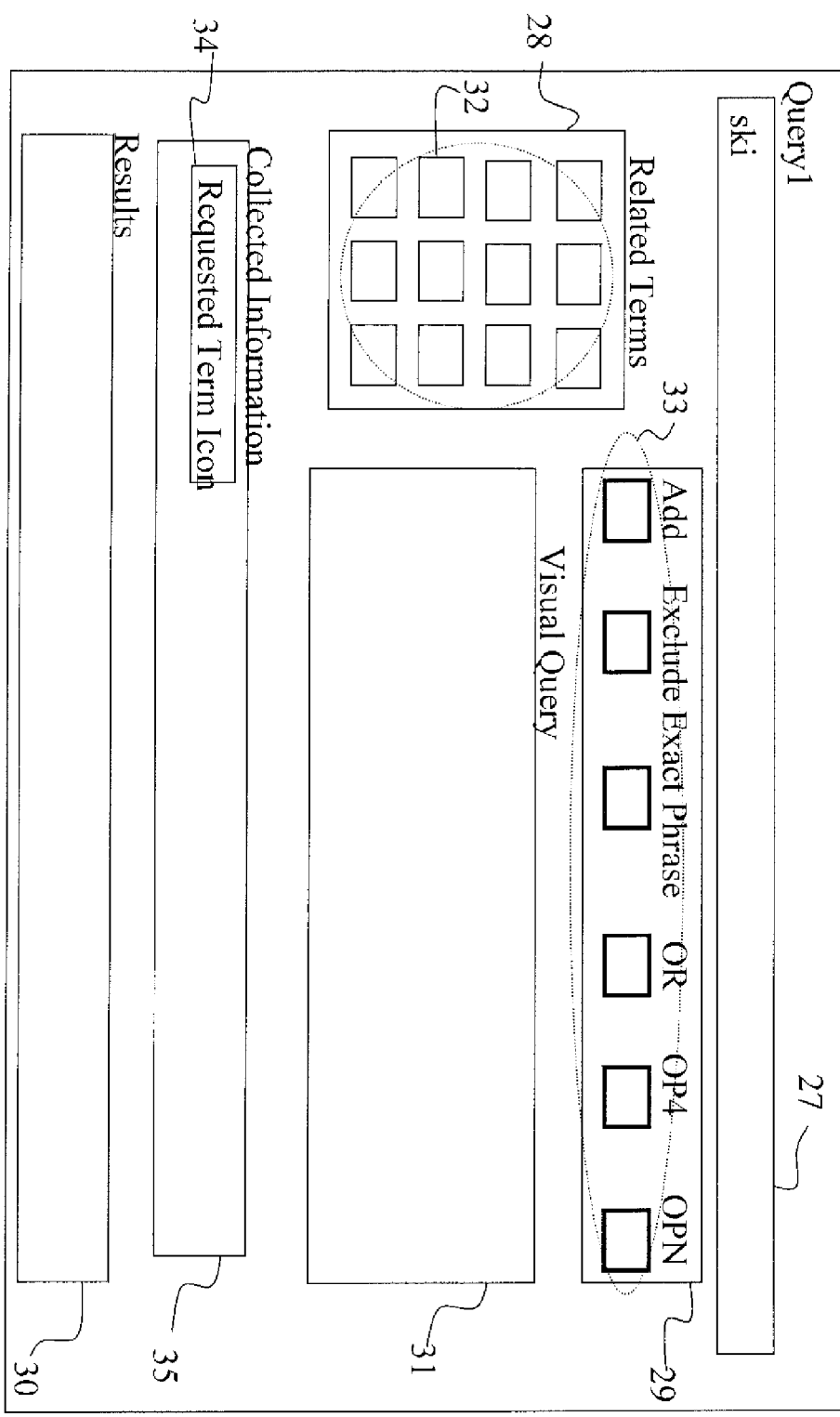
Figure 7:
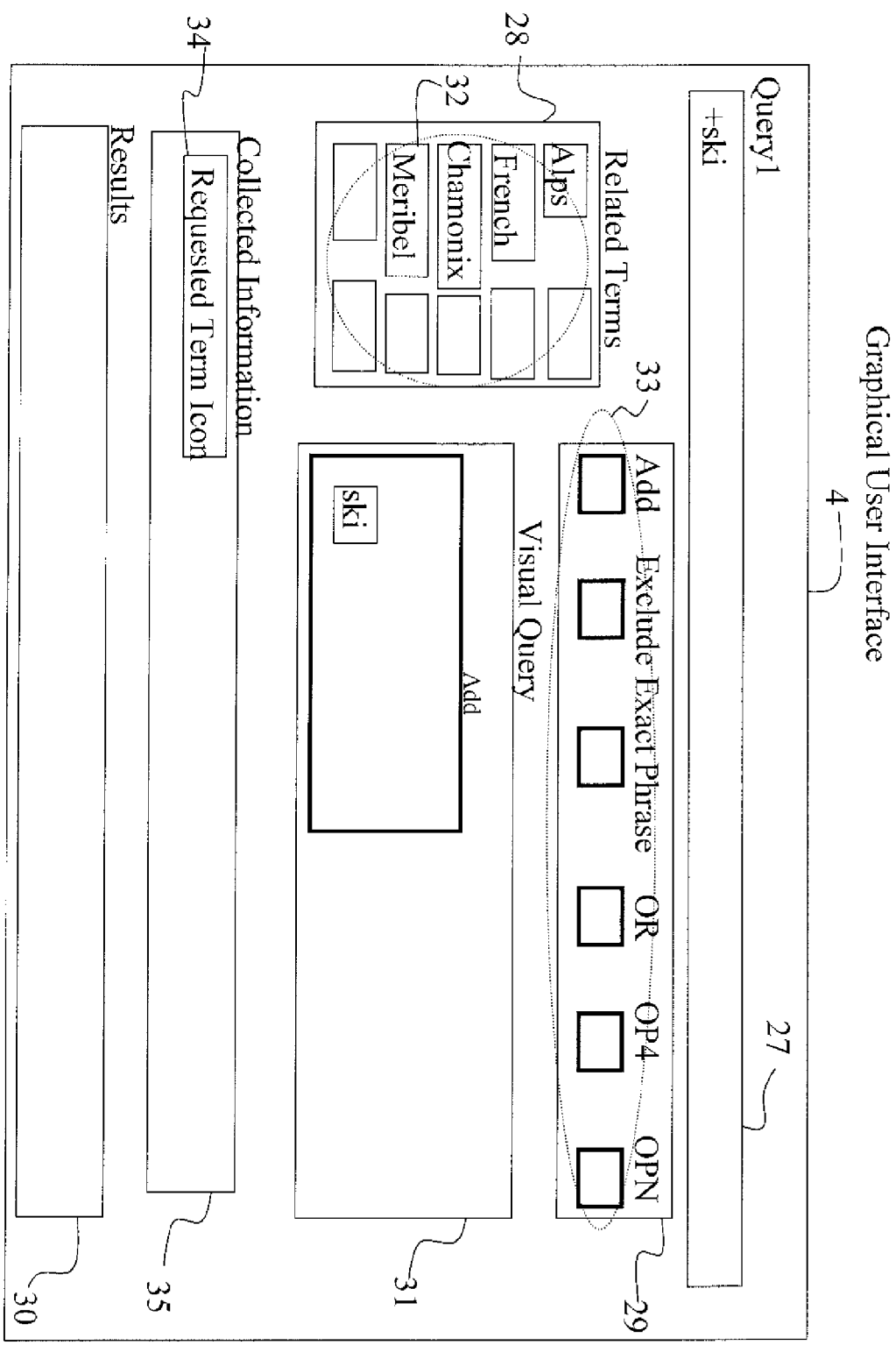
Figure 8:
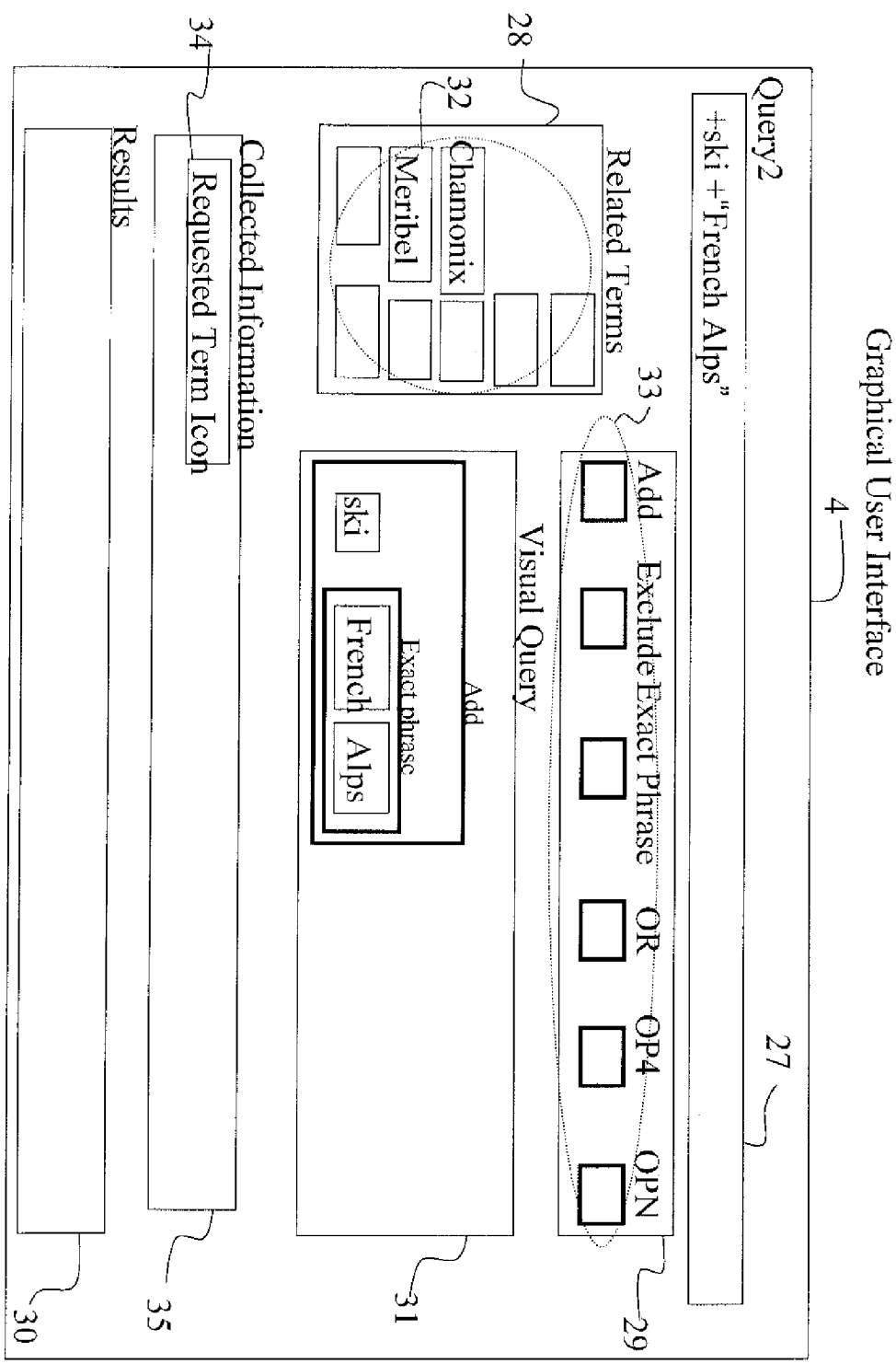
Figure 9:
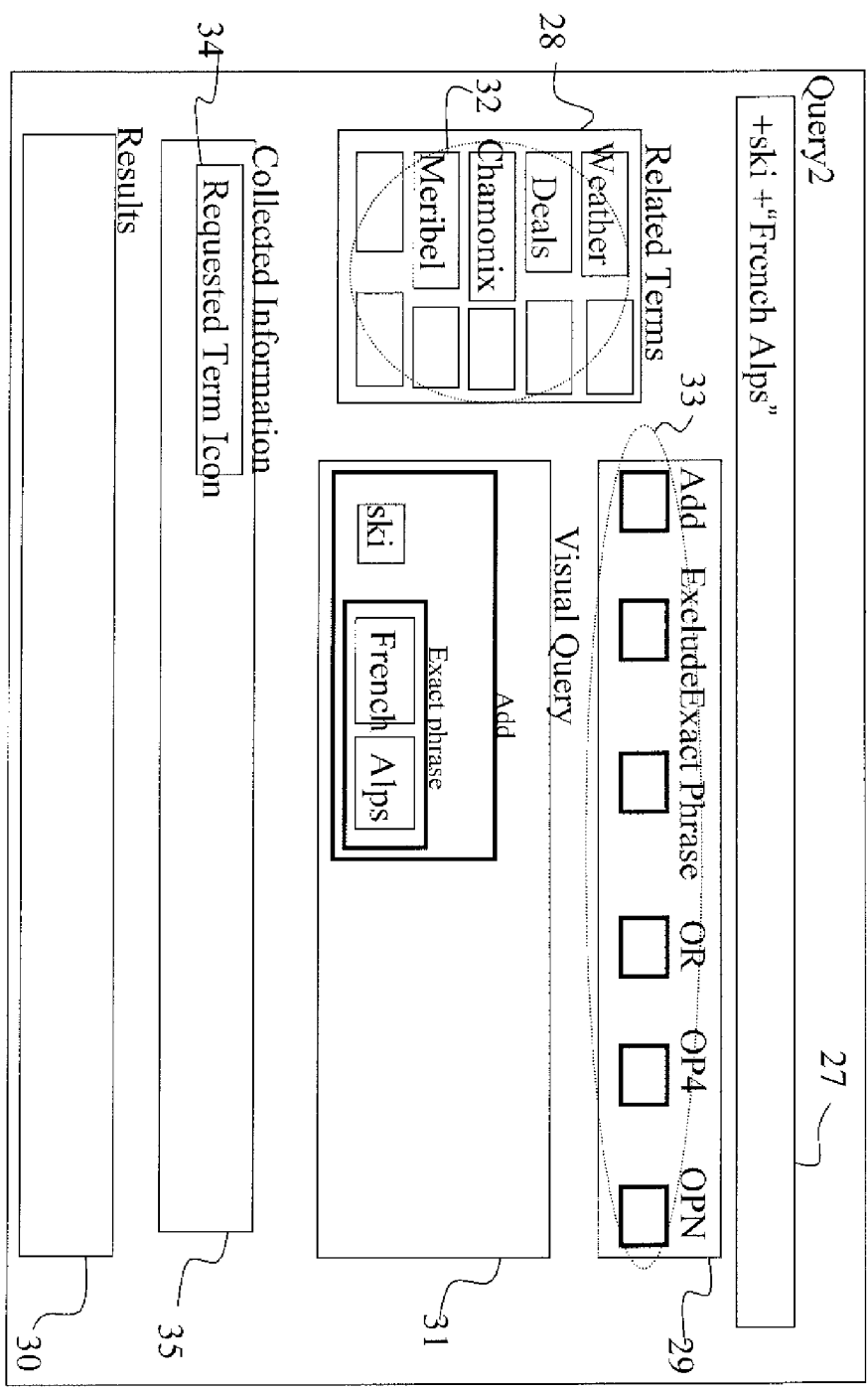
Figure 10:
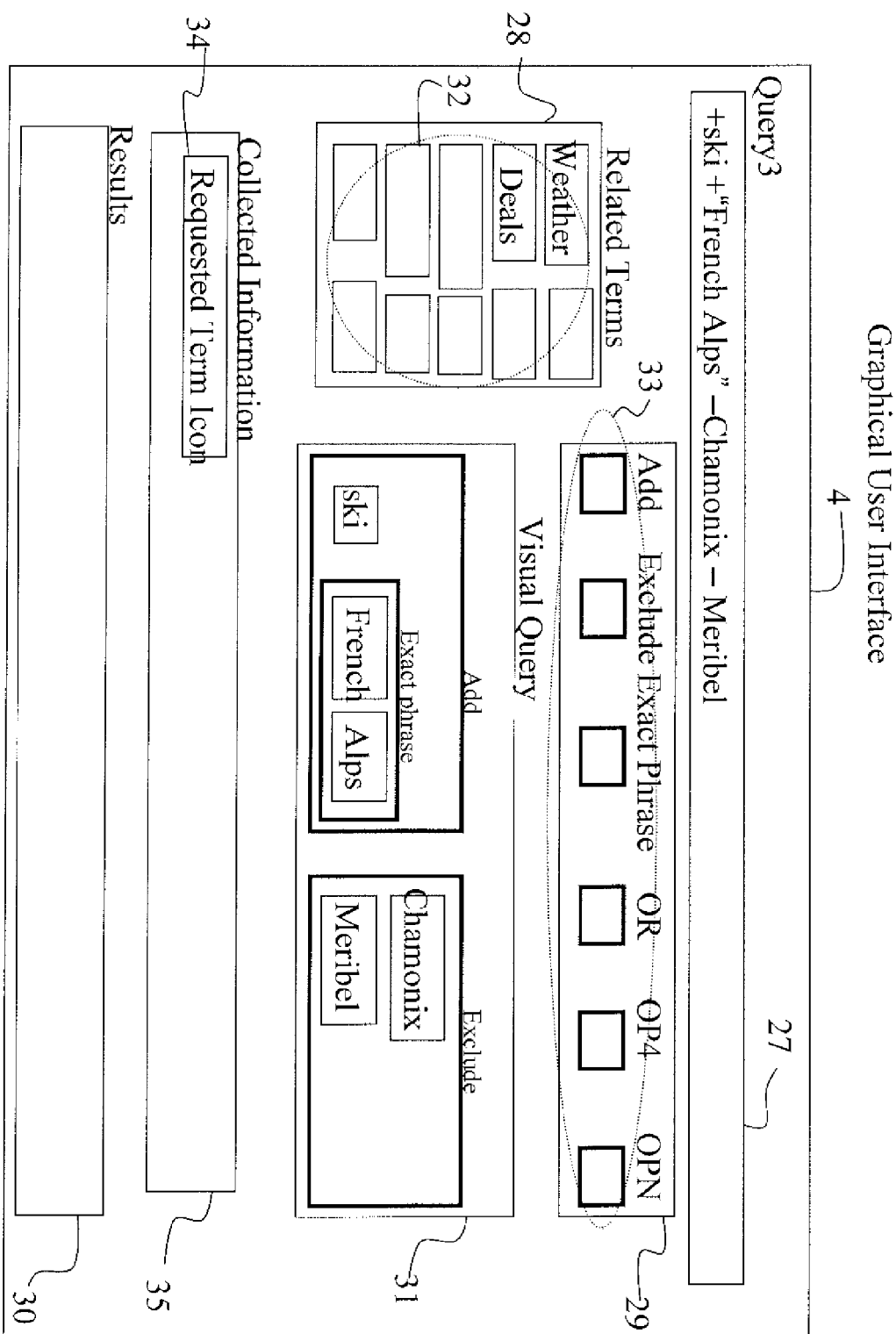

In FIG. 6, the user chooses to enter the word "ski" in query field 27. In FIG. 7, several related terms icons 32 appear in related terms field 28, including "Alps" and "French". Turning to FIG. 8, the user has selected related term icons 32 tagged "French" and "Alps" and dragged them to visual query field 31. The user then chooses the "Exact Phrase" operator frame 33 and locates it around the icons "French" and "Alps". The user further chooses the "AND" operator frame 33 from the corresponding operator field 29 and locates it around the icons "ski", "French", and "Alps" in visual query field 31. After the revised search, the search results field 34 will show the updated results and related terms field 28 will be updated with new related terms icons 32. Turning to FIG. 9, the related terms field 28 is updated with new related terms icons 32. Turning to FIG. 10, the user wishes to exclude Chamonix and Meribel resorts from the search. The user drags the related terms icons 32 tagged "Chamonix" and "Meribel" from the related terms field 28 to the visual query field 31. He then drags the "Exclude" operator frame 33 from the corresponding operator field 29 and places it accordingly in the visual query field 31. The search results field 30 will reflect the further update in the search results. In this manner, the user is able to further narrow or broaden his search by continuing the above process.

Figure 11:
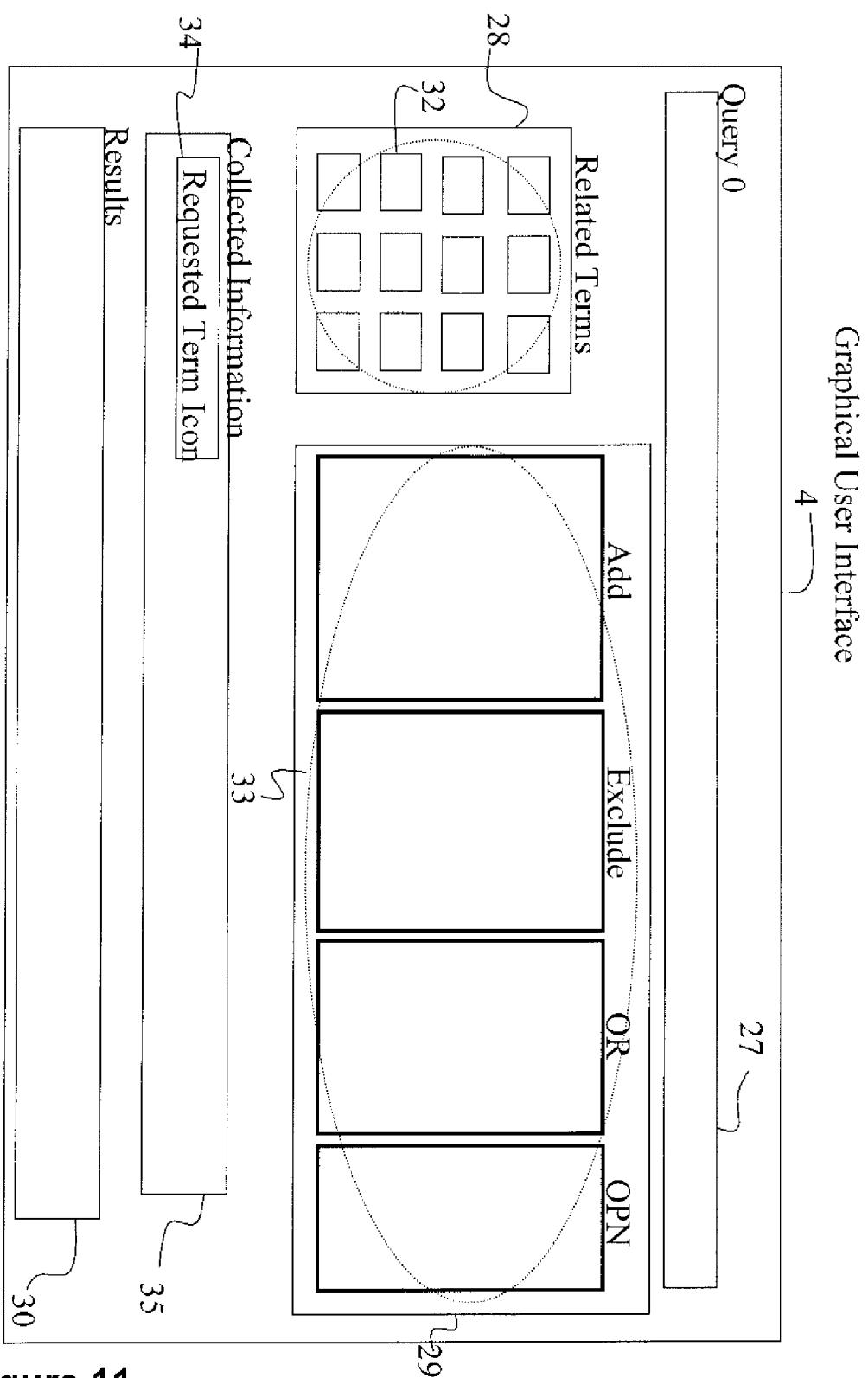

Turning to FIG. 11, an alternative GUI 4 is described. The GUI 4 in FIG. 11 is similar the GUI 4 in FIG. 5, wherein the visual query field 31 is omitted and the operators frames 33 and operator field 29 are extended.

Figure 12:
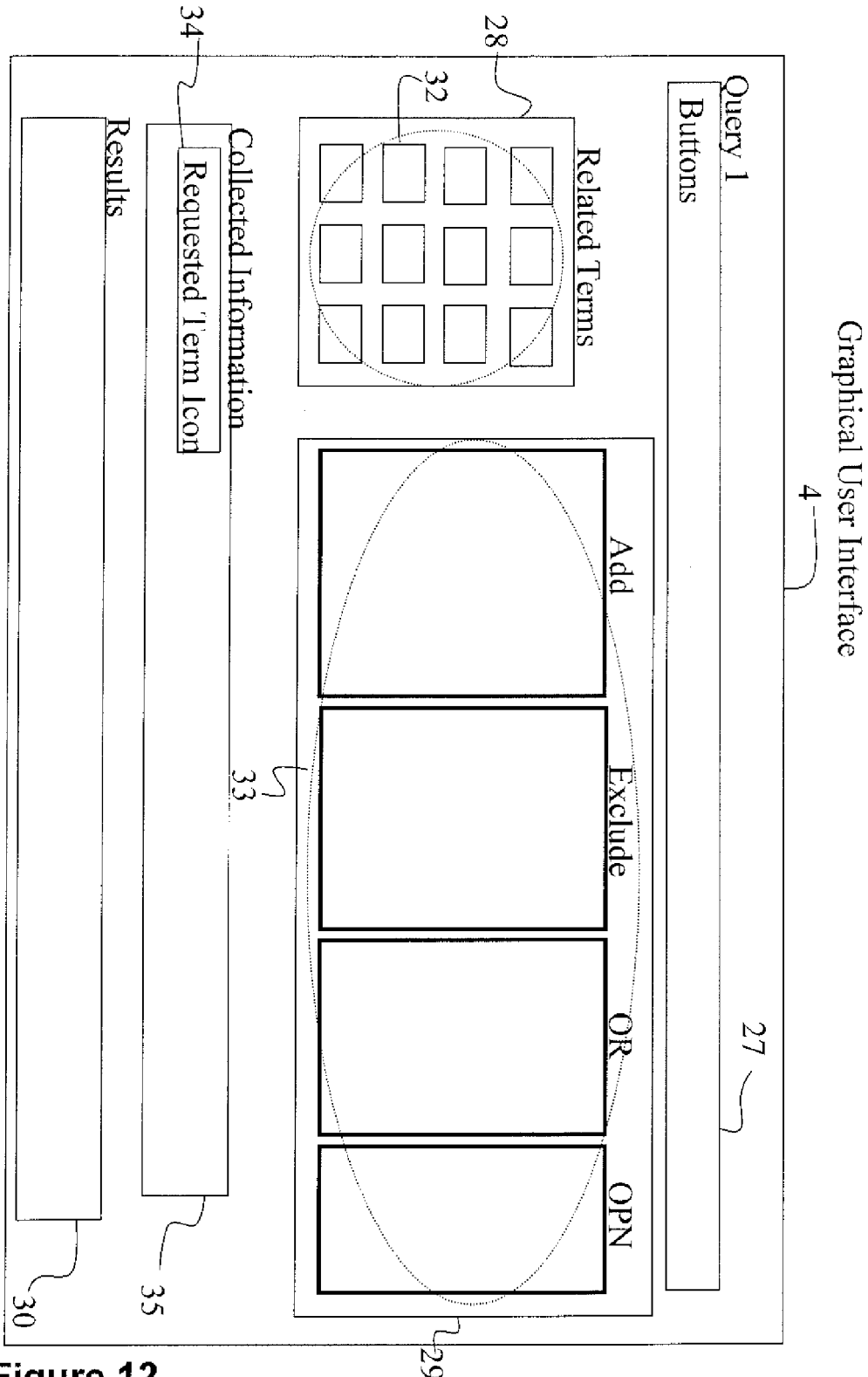
Figure 13:
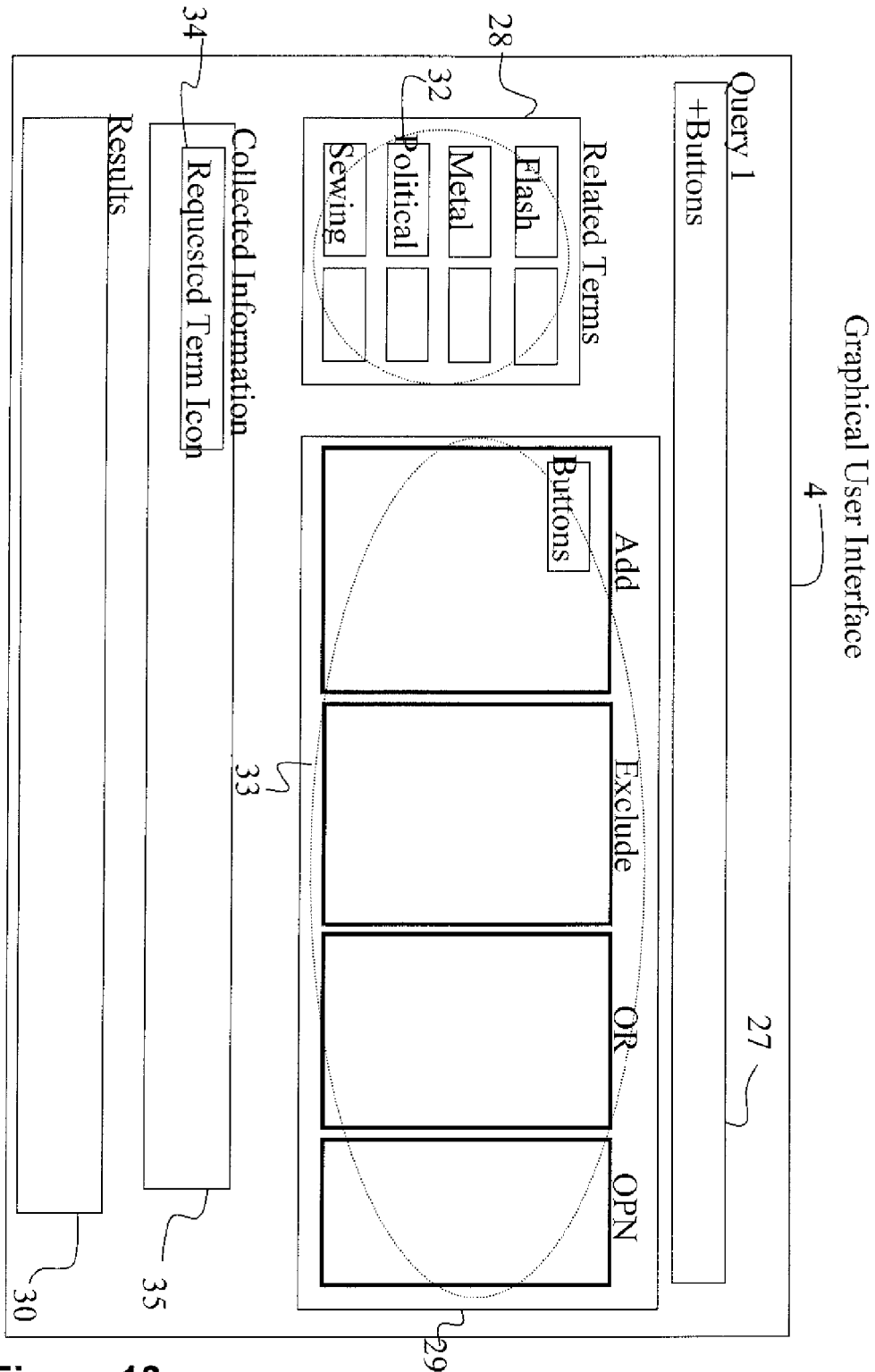
Figure 14:
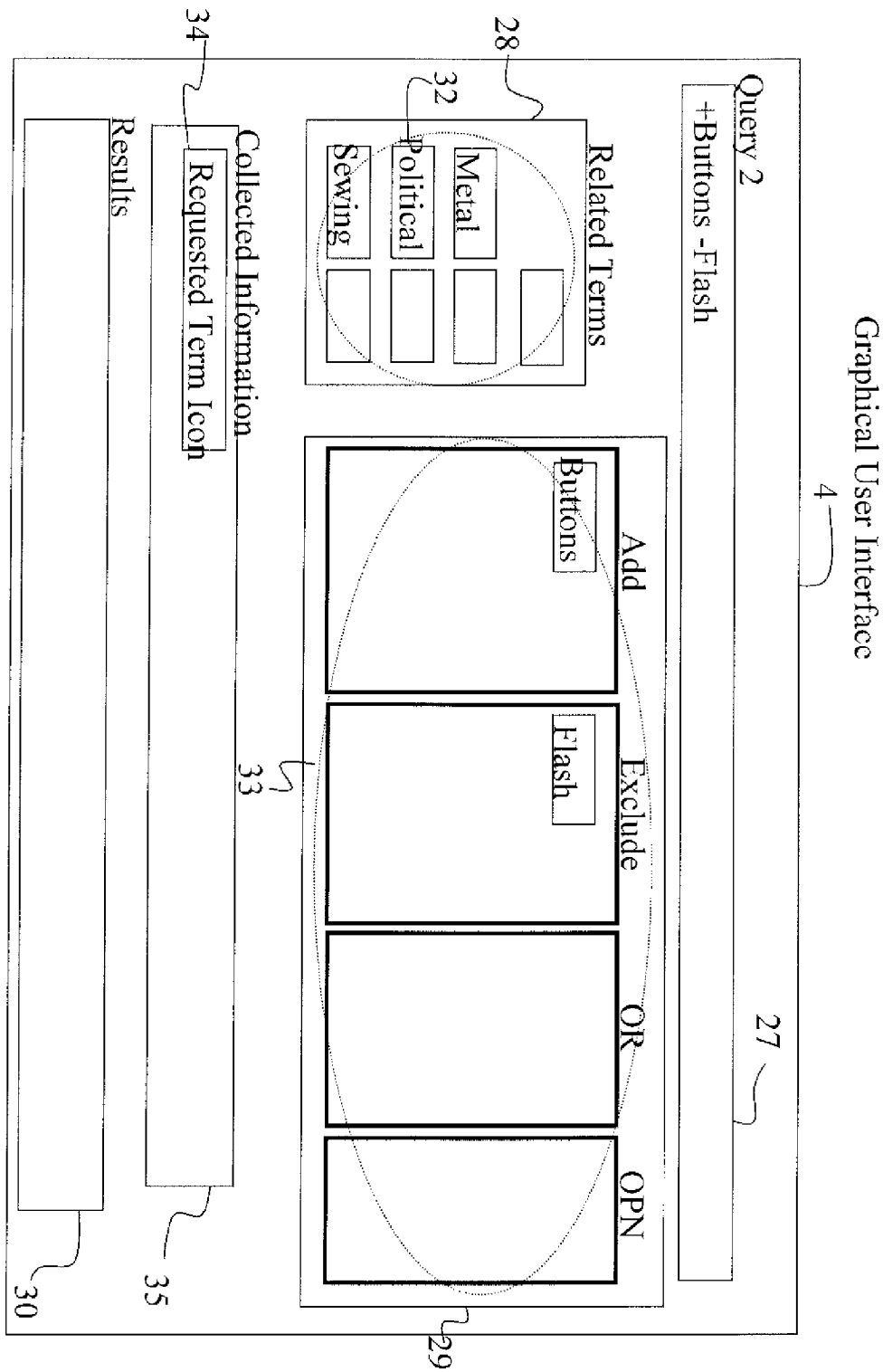
Figure 15:
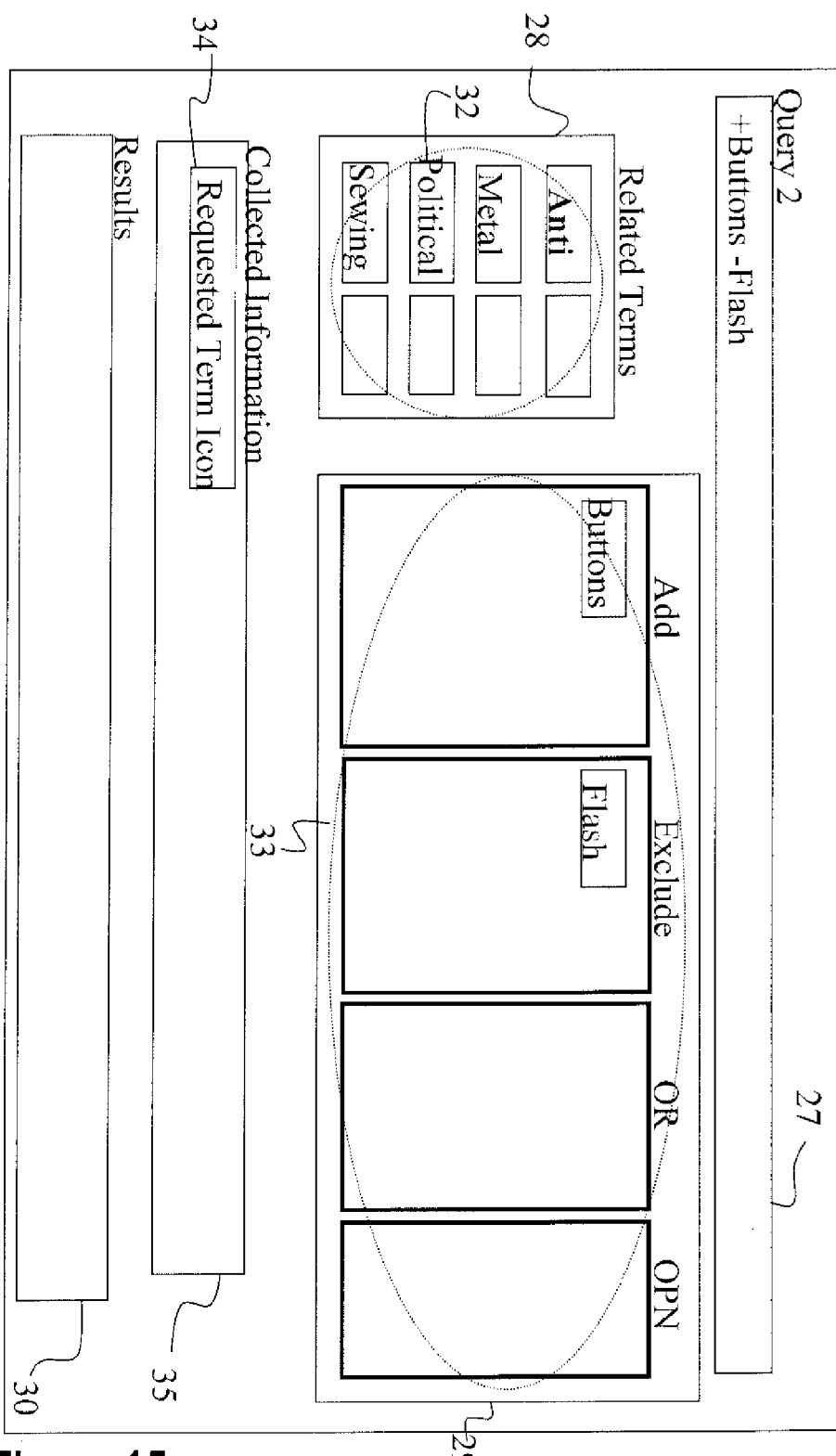
Figure 16:
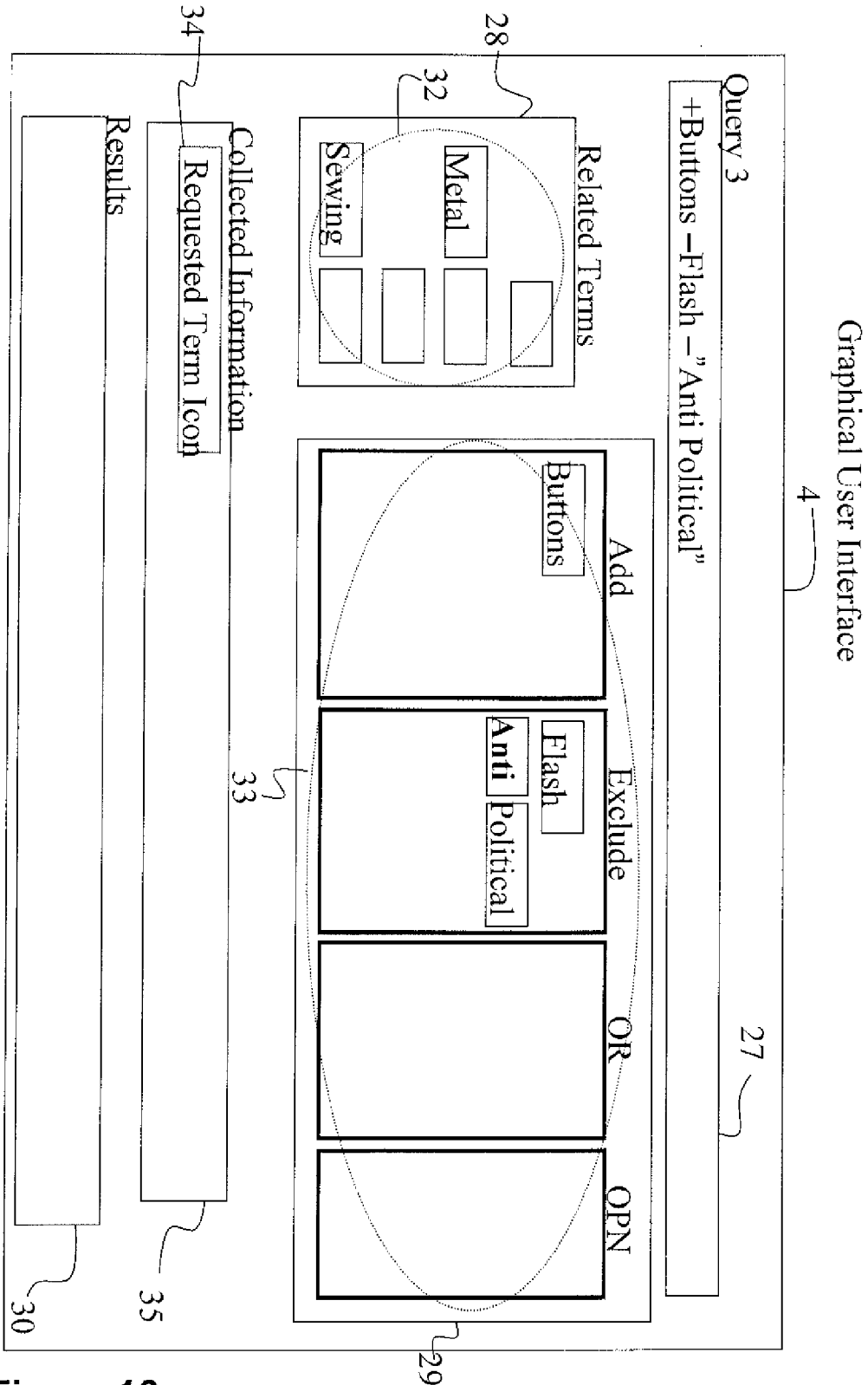
Figure 17:
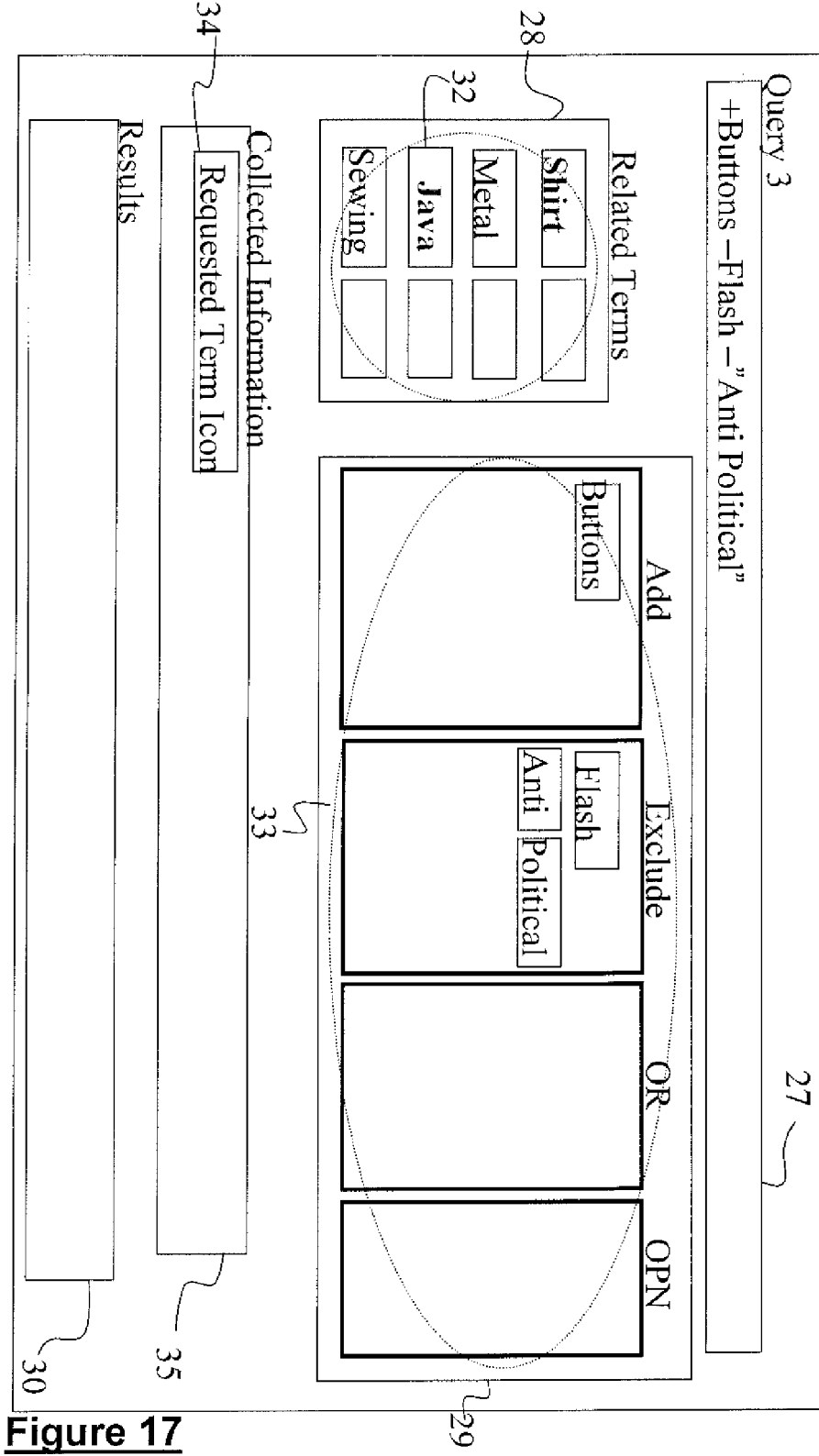
Figure 18:
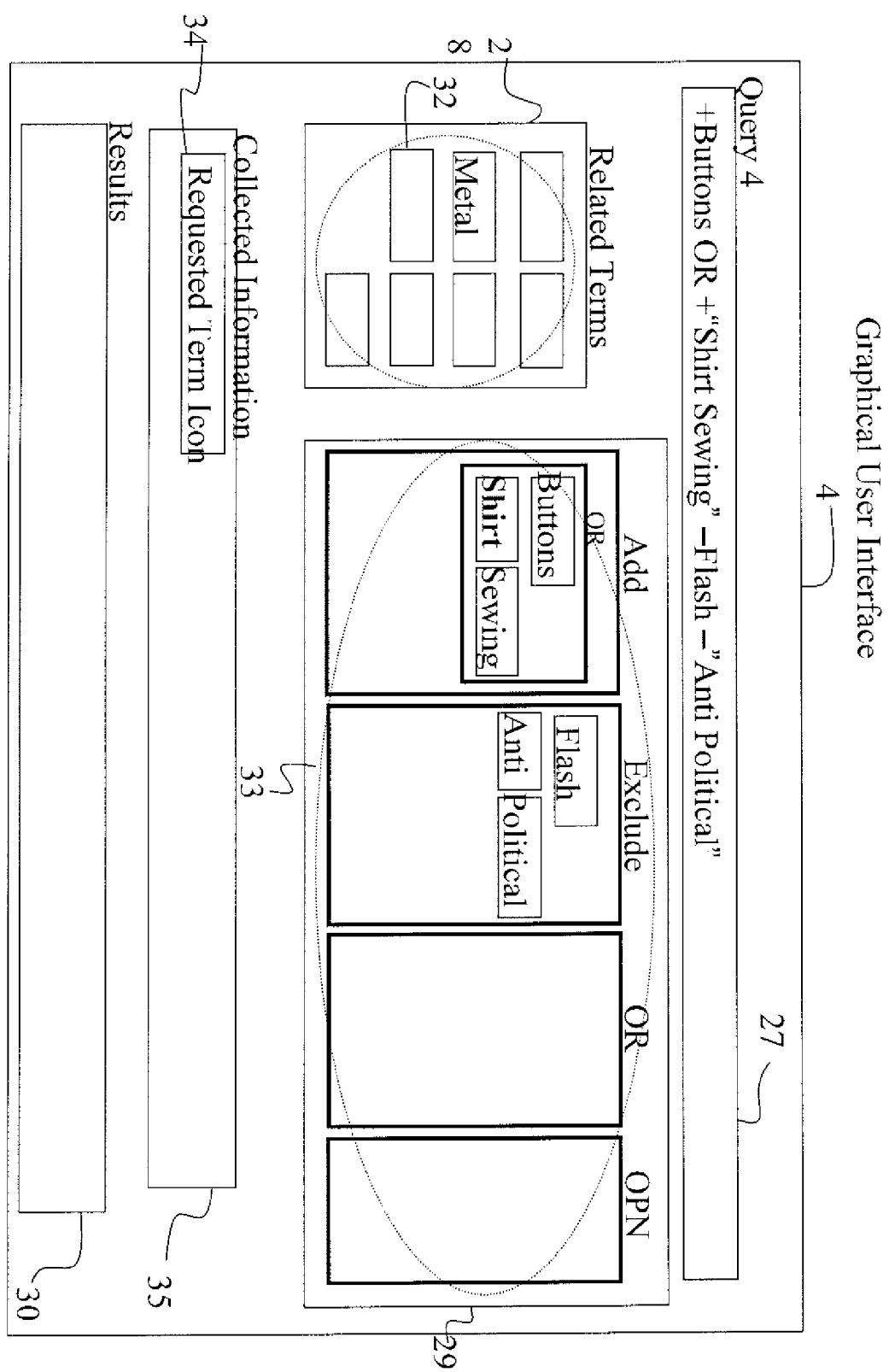
Figure 19:
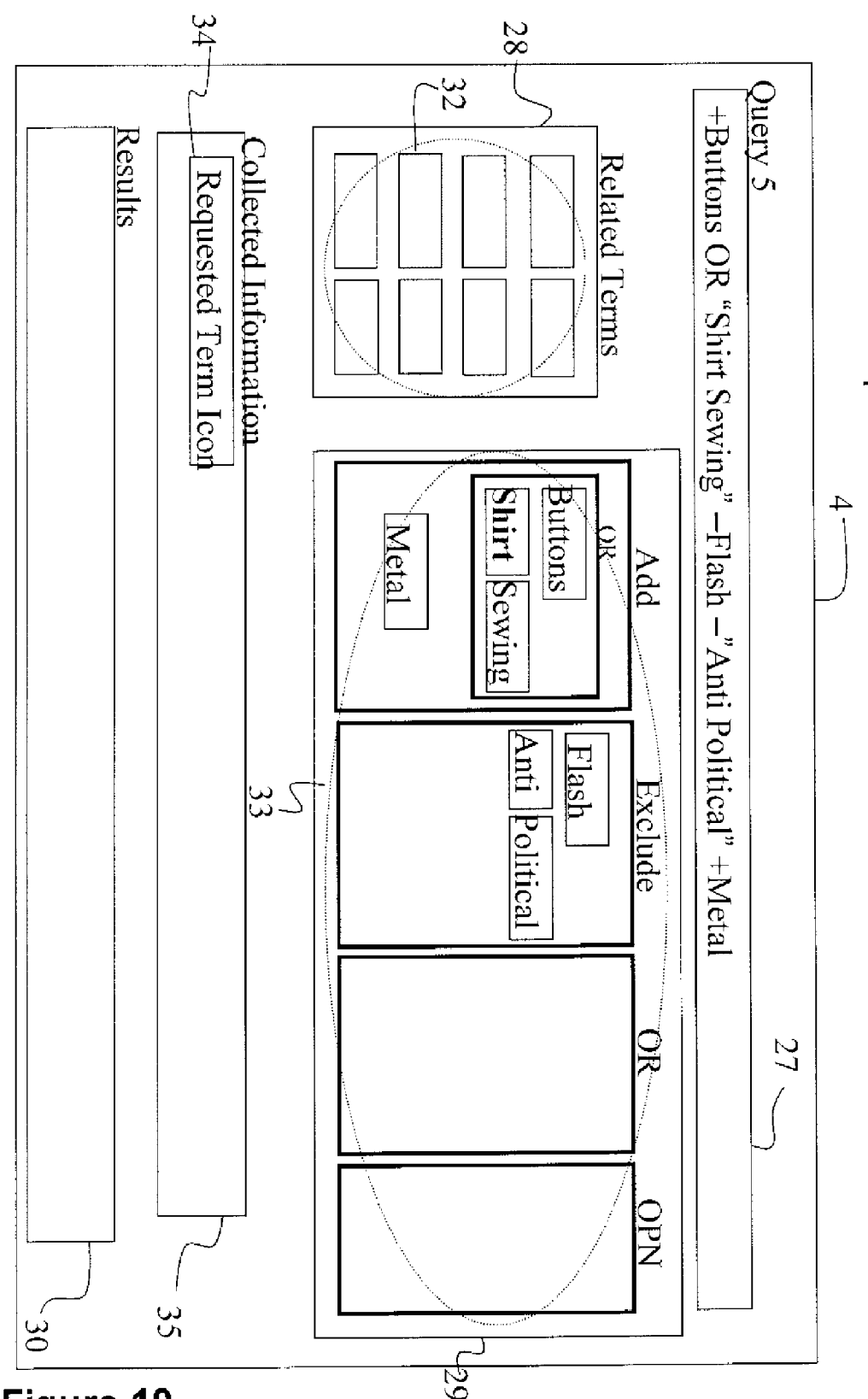

Now the exemplary search sequence of FIGS. 12 to 19 will be described briefly. In FIG. 12, a search word is placed in the query field 27; in FIG. 13, several related terms icons 32 appear in the related terms field 28; in FIG. 14, the user excludes one related term icon 32 by dragging it to the "Exclude" operator frame 33 in the operators field 29; in FIG. 15, additional related terms icons 33 appear in the related terms field 28; in FIG. 16, two related term icons 32 are excluded from the search by dragging them to the "Exclude" operator frame 33 in the operators field 29; in FIG. 17, yet further related terms icons 32 appear in the related terms field 28; in FIG. 18, the user drags two more related terms icons to the "Add" operator frame and locates the "OR" operator frame around all of the related terms icons in the "Add" operator frame; in FIG. 19, the user adds another term to the search by dragging an icon from the related terms icons 32 to the "Add" operator frame 33 in the operators field 29. During the abovementioned sequence the search results field is being updated in accordance with the current query.

FIG. 20 depicts an exemplary table showing how the related terms generator database may operate. The two leftmost columns represent the current query and the information located on a specific website respectively. The resulting comparison of the parameters in the first two columns is placed in the third column and differences between the first two columns is placed in the fourth column. This process enables the related terms generator to provide each website or document with a certain rank or score in accordance with a specific query. This score is written on the fifth column from the left of the table.

While the above description contains many specifications, these should not be construed as limitations on the scope of the invention, but rather as exemplifications of the preferred embodiments. Those skilled in the art will envision other possible variations that are within the scope of the invention.

Accordingly, the scope of the invention should be determined not by the embodiment illustrated, but by the appended claims and their legal equivalents.

What is claimed is:

1. A system for generating search queries using visual manipulation of search terms to facilitate a search process over a data network, comprising:
a computer connected to said data network;
a related terms generator scans over said data network from said computer to obtain at least a list of terms related to an initial search query, wherein the related terms generator further obtains relationships involving said related terms and data entities at different locations in said data network, and organizes said related terms, said relationships, and said data entities in at least one data structure that represents said relationships in said data network, wherein the data structure is organized, based on at least one of data network analysis and expert knowledge, wherein the data entities in said data network are analyzed in accordance with statistical correlations of word frequencies, location, and dates within the data network;
a graphical user interface (GUI) at said computer for receiving the initial search query, providing a user with said related terms, wherein said related terms being provided as graphical icons, wherein said GUI further allows visual manipulating of said initial search query by visually placing graphical icons respective of one or more of said related terms to be included in a new refined search query in a plurality of graphical operators controlled by said GUI, each of said plurality of graphical operators applies a different operation on related terms placed therein, wherein said visual manipulation of said initial search query results in a new visual representation of said graphical icons respective of said one or more related terms and interrelationships of said graphical icons with said plurality of graphical operators; and
a query generator for generating said new refined search query by applying said plurality of graphical operators on said one or more of related terms, thereby modifying said initial search query according to said visual manipulation.

2. The system of claim 1, wherein said plurality of graphical operators include any type of Boolean operators, proximity operators, and statistic operators.

3. The system of claim 1, wherein the related terms generator provides the user with suggestions for at least one of: additional related terms, removal of unrelated terms, and applying any of the graphical operators on the related terms.

4. The system of claim 1, wherein said GUI includes the capabilities of at least one of visual confining, drag-and-drop, visual positioning, and graphics marking for enabling the visual placing of said graphical icons in said plurality of graphical operators.

5. The system of claim 4, wherein said capabilities further enable visually placing of said plurality of graphical operators over said graphical icons associated with search terms to be included in said new refined search query.

6. The system of claim 1, wherein the relationships between data entities in said data network are analyzed in accordance with statistical correlations of word frequencies from prior searches history.

7. The system of claim 1 wherein said related terms may include one of the following: synonyms, context, statistics.

8. A computer implemented method for generating search queries using visual manipulation of search terms to facilitate a search process over a data network, comprising:
receiving an initial search query as a visual representation, said visual representation includes at least one search term as an initial graphical icon;
scanning over said network and, based on said scan, providing at least a list of related terms associated with said initial search query, wherein said related terms are being provided as additional graphical icons, wherein the scanning includes obtaining relationships involving said related terms and data entities at different locations in said data network, and organizing said related terms, said relationships, and said data entities in at least one data structure that represents said relationships in said data network, wherein the data structure is organized, based on at least one of data network analysis and expert knowledge, wherein the data entities in said data network are analyzed in accordance with statistical correlations of word frequencies, location, and dates within the data network;
enabling a user to visually manipulate said initial search query by visually placing one or more of said initial graphical icon and said additional graphical icons respective of one or more related terms to be included in a new refined search query in a plurality of graphical operators, each of said plurality of graphical operators applies a different operation on related terms placed therein, wherein said visual manipulation results in a new visual representation of graphical icons respective of said one or more related terms and interrelationships of said graphical icons with said plurality of graphical operators; and
generating said new refined search query by applying said plurality of graphical operators on said one or more of related terms, thereby modifying said initial search query according to said visual manipulation.

9. The system of claim 1 wherein the GUI further enables the user to request and receive collected information on at least one of related terms and search terms included in the initial search query within the data network.

10. The system of claim 1, wherein the GUI further enables the visual manipulation of said initial search query by visually placing search terms included in said initial search query in said plurality of graphical operators.

11. The system of claim 1, wherein the related terms generator is further configured for scanning a database for terms and relationships involving said terms and data entities in said data network, thereby providing additional related terms.

12. The system of claim 1, wherein the query generator is configured to carry out a search based on said new refined search query.

13. The system of claim 1, wherein said plurality of graphical operators include at least a graphical operator to add at least one search term to said new refined search query and a graphical operator to exclude at least one search term from a refined search performed using said new refined search query.

14. The system of claim 13, wherein said plurality of graphical operators further include a graphical operator to create phrases from at least two search terms to be included in said new refined search query.

15. The system of claim 1, wherein each of said plurality of graphical operators is graphically displayed as a separate frame.

16. The system of claim 15, wherein the GUI to combine, in serial and in parallel, several graphical operators, thus creating a composite operator, wherein the combining includes visually placing a frame of one graphical operator within a frame of another operator.

17. The system of claim 8, wherein the data structure further includes a term ranking method that represents the importance of each search term.

18. The method of claim 8, further comprising:
scanning said data network using said new refined search query.

19. The method of claim 8, further comprising:
providing the user with suggestions for at least one of: additional related terms removing unrelated terms, and excluding related terms based on scanned results.

20. The method of claim 8, further comprising:
obtaining relationships involving said related terms and data entities at different locations in said data network, and organizing said related terms, said relationships, and said data entities in at least one data structure that represents said relationships in said data network, wherein the data structure is organized based on at least one of data network analysis and expert knowledge.

21. The method of claim 20, wherein the relationships between data entities in said data network are analyzed in accordance with statistical correlations of word frequencies, locations, and dates within the data network.

22. The method of claim 8, wherein the graphical operators include any type of Boolean operators, proximity operators, and statistic operators.

23. The method of claim 8 further comprising:
providing the user with collected information including one of the following: synonyms, context, statistics.

24. The method of claim 23 wherein the collected information includes term ranking values that represent the importance of each search term.

25. The method of claim 8, wherein said plurality of graphical operators include at least a graphical operator to add at least one search term to said new refined search query and a graphical operator to exclude at least one search term from a refined search performed by said new refined search query.

26. The method of claim 25, wherein said plurality of graphical operators further include a graphical operator to create phrases from at least two search terms to be included in said new refined search query.

27. The method of claim 8, wherein each of said plurality of graphical operators is graphically displayed as a separate frame.

28. The method of claim 27, further comprising:
enabling the user to combine, in serial and in parallel, several graphical operators, thus creating a composite operator, wherein the combining includes visually placing a frame of one graphical operator within a frame of another operator.

29. The method of claim 8, wherein said visual placing of said graphical icons in said plurality of graphical operators includes at least one of: visual confining, dragging-and-dropping, visual positioning, and graphics marking of said graphical icons.

30. The method of claim 29, further comprising: visually placing said plurality of graphical operators over said graphical icons associated with search terms to be included in said new refined search query.

\* \* \* \* \*